(12) United States Patent
Tsai et al.

(10) Patent No.: US 10,368,306 B2
(45) Date of Patent: Jul. 30, 2019

(54) COMMUNICATING METHOD AND ASSOCIATED ELECTRONIC DEVICE

(71) Applicant: MEDIATEK INC., Hsin-Chu (TW)

(72) Inventors: I-Cheng Tsai, Hsinchu County (TW); Yung-En Hsieh, Taipei (TW); Shun-Yong Huang, Hsinchu County (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 15/894,957

(22) Filed: Feb. 13, 2018

(65) Prior Publication Data

US 2018/0242241 A1    Aug. 23, 2018

Related U.S. Application Data

(60) Provisional application No. 62/460,099, filed on Feb. 17, 2017.

(51) Int. Cl.
| | |
|---|---|
| *H04W 52/02* | (2009.01) |
| *H04W 40/24* | (2009.01) |
| *H04W 84/12* | (2009.01) |
| *H04W 84/20* | (2009.01) |
| *H04W 88/10* | (2009.01) |

(52) U.S. Cl.
CPC ..... *H04W 52/0206* (2013.01); *H04W 40/244* (2013.01); *H04W 84/12* (2013.01); *H04W 84/20* (2013.01); *H04W 88/10* (2013.01); *Y02D 70/00* (2018.01); *Y02D 70/10* (2018.01); *Y02D 70/14* (2018.01); *Y02D 70/142* (2018.01); *Y02D 70/22* (2018.01)

(58) Field of Classification Search
None
See application file for complete search history.

(56) References Cited

U.S. PATENT DOCUMENTS

| | | | |
|---|---|---|---|
| 10,140,820 B1 * | 11/2018 | Zalewski | ............ G07G 1/0072 |
| 2007/0259700 A1 | 11/2007 | Meier | |
| 2013/0182622 A1 * | 7/2013 | Lin | ............ H04W 52/0251 370/311 |
| 2014/0086209 A1 * | 3/2014 | Su | ............ H04W 74/02 370/331 |
| 2014/0241257 A1 | 8/2014 | Ding | |
| 2015/0318942 A1 | 11/2015 | Jafarian | |
| 2016/0241433 A1 | 8/2016 | Huang | |
| 2016/0330788 A1 * | 11/2016 | Zheng | ............ H04W 28/0205 |

* cited by examiner

*Primary Examiner* — Eunsook Choi
(74) *Attorney, Agent, or Firm* — Winston Hsu

(57) ABSTRACT

A communicating method of a communication device for connecting to a first network and a second network includes: when a rescheduling condition is reached, rescheduling a wake up period of the communication device for the first network at least according to a wake up period of the communication device for the second network; wherein the wake up period of the communication device for the first network is rescheduled by making the communication device a master device in the first network through adjusting a preference parameter of the first network.

20 Claims, 7 Drawing Sheets

COMMUNICATING METHOD AND ASSOCIATED ELECTRONIC DEVICE

CROSS REFERENCE TO RELATED APPLICATIONS

This application claims the benefit of U.S. Provisional Application No. 62/460,099, which was filed on Feb. 7, 2017, and is incorporated herein by reference.

BACKGROUND

The present invention relates to a communicating method for a concurrent operation of a Legacy Wireless Local Area Network (WLAN) and a Wi-Fi Aware and an associated electronic device.

In Wi-Fi Aware applications, a scenario where a Legacy WLAN is concurrent with a point-to-point (P2P) operation with Wi-Fi Aware will be a major feature. In this scenario, a user can access the Internet through a Legacy WLAN AP while using the Wi-Fi Aware service to discover other devices. For cost saving purposes, only a single MAC/PHY is used to provide a dual network connection (i.e. Wi-Fi Aware and Legacy WLAN), which will introduce the issue of dual network scheduling in the time domain.

SUMMARY

One of the objectives of the present invention is therefore to provide a communicating method and an associated electronic device to solve the abovementioned problem.

According to an embodiment of the present invention, a communicating method of a communicating device for connecting to a first network and a second network is disclosed, comprising: when a rescheduling condition is fit, rescheduling a wake up period of the communication device for the first network at least according to a wake up period of the communication device for the second network; wherein the wake up period of the communication device for the first network is rescheduled by making the communication device a master device in the first network through adjusting a preference parameter of the first network.

According to an embodiment of the present invention, an electronic device for connecting a first network and a second network is disclosed, comprising: a storage device and a processor, wherein the storage device is arranged to store a program code; and the processor is arranged to execute the program code; wherein when loaded and executed by the processor, the program code instructs the processor to execute the following steps: when a rescheduling condition is fit, rescheduling a wake up period of the communication device for the first network at least according to a wake up period of the communication device for the second network; wherein the wake up period of the communication device for the first network is rescheduled by making the communication device a master device in the first network through adjusting a preference parameter of the first network.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should not be interpreted as a close-ended term such as "consist of". Also, the term "couple" is intended to mean either an indirect or direct electrical connection. Accordingly, if one device is coupled to another device, that connection may be through a direct electrical connection, or through an indirect electrical connection via other devices and connections.

Figure 1:
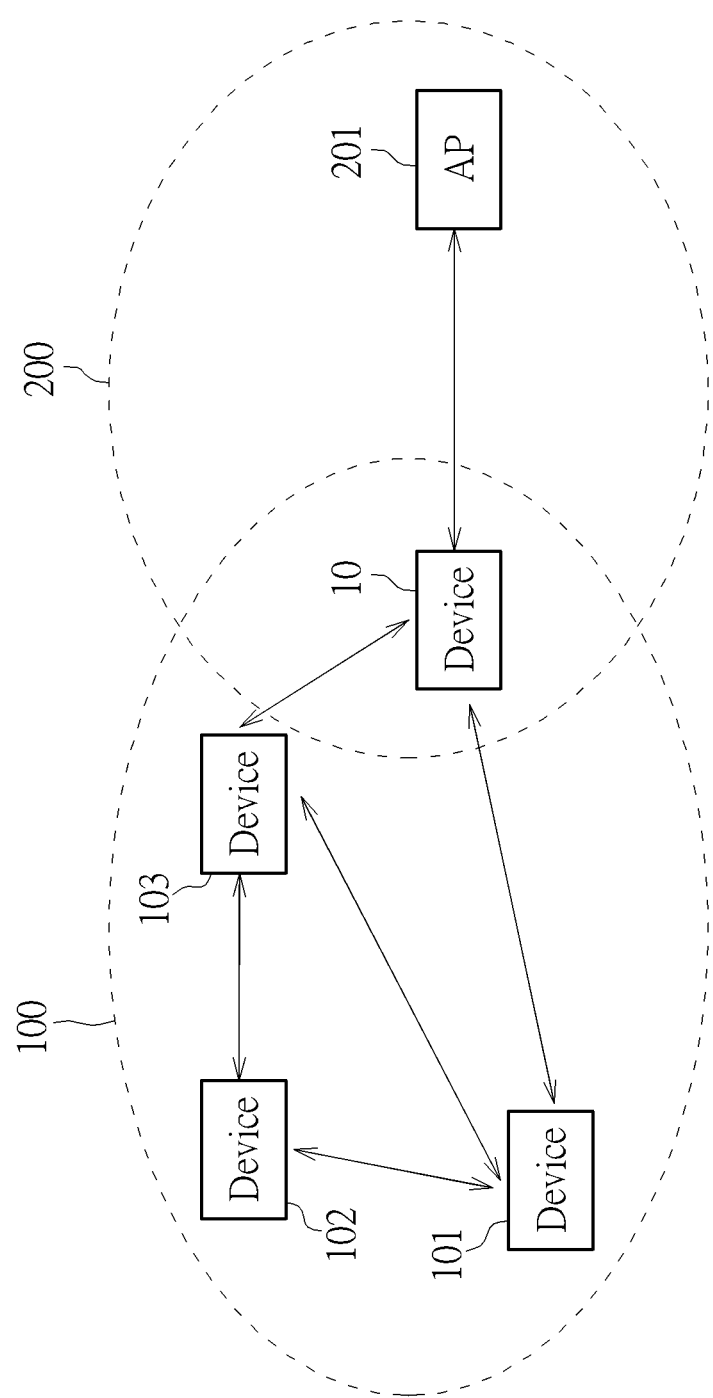
FIG. 1 is a diagram illustrating a concurrent operation of a first network and a second network.

FIG. 1 is a diagram illustrating a concurrent operation of a first network 100 and a second network 200, wherein the first network 100 supports neighbor awareness networking (NAN) and comprises NAN devices 10, 101, 102, and 103 using the NAN service provided by the first network 100. For example, the first network 100 is Wi-Fi Aware, and each of the NAN devices 10, 101, 102, and 103 uses a Wi-Fi Aware service to discover other devices and communicate with each other (e.g. by sending beacons). Assuming that one of the NAN devices 10, 101, 102, and 103 (e.g. the NAN device 10) further tries to build a connection with an access point (AP) 201 of the second network 200, the NAN device 10 will perform communication with the AP 201 (e.g. by listening to beacons from the AP 201). For example, the second network 200 is Legacy WLAN, and the NAN device 10 tries to access the Internet through the AP 201 of the second network 200. In this situation, the basic service set (BSS) of the AP 201 for the second network 200 (e.g. the Legacy WLAN) and the first network 100 (e.g. the Wi-Fi Aware) may operate in the same or different regulatory classes and channels. As mentioned above, when the NAN device 10 only uses a single MAC solution to provide virtual MAC entities over one PHY entity (i.e. only one set of radio frequency (RF) circuits is installed in the NAN device 10), a scheduling scheme is desired to solve the issues of dual network scheduling in the time domain.

Figure 2:
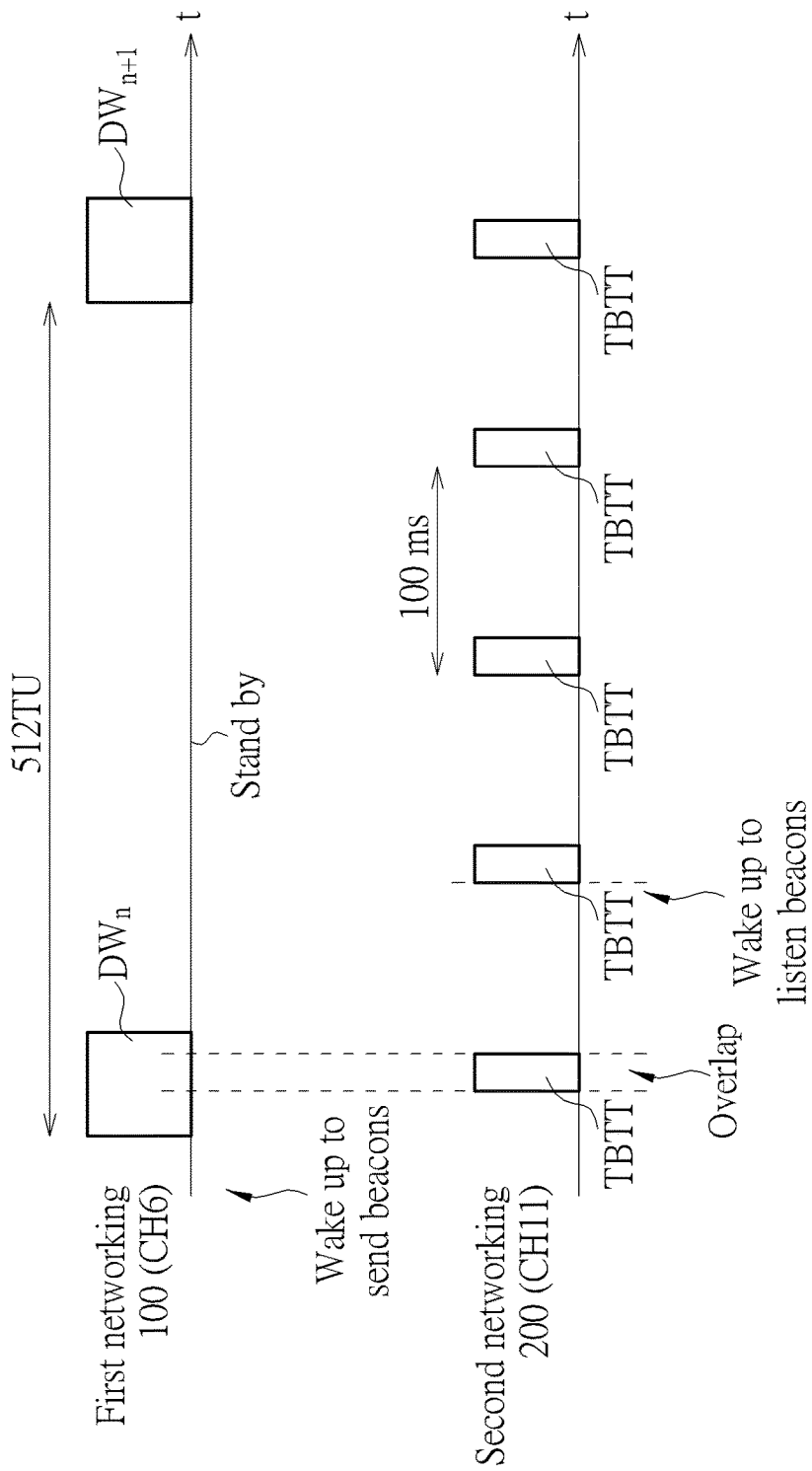
FIG. 2 is a diagram illustrating a first dual network scheduling issue under a concurrent operation between the first network and the second network.

Some scenarios of the NAN device 10 working under a concurrent operation of the first network and the second network will be described with reference to FIG. 2 and FIG. 3. FIG. 2 is a diagram illustrating a first dual network scheduling issue for the NAN device 10 under a concurrent operation of the first network 100 and the second network 200. Assume the NAN device 10 has initially established the first network 100 (e.g. Wi-Fi Aware), and then tries to connect to the AP 201 of the second network (e.g. Legacy WLAN) in a different channel. The first network 100 may be established on a first channel (e.g. channel 6), and the second network 200 may be established on a second channel which is different from the first channel (e.g. channel 11). Concerning the first network 100 (e.g. Wi-Fi Aware), the NAN device 10 has to wake up to perform communication (e.g. sending beacons) with other NAN devices (e.g. the NAN devices 101-103) every predetermined time period (e.g. 512 time units as shown in FIG. 2), wherein the wakeup period for the first network 100 (e.g. Wi-Fi Aware) is defined as a discovery window (DW), and other periods except for the wake up period are defined as stand-by periods for the NAN device 10. Concerning the second network 200 (e.g. Legacy WLAN), the NAN device 10 has to wake up to listen for beacons from the AP 201 of the second network 200 (e.g. Legacy WLAN) every predetermined time period (e.g. 100 ms as shown in FIG. 2), wherein the wakeup period for the second network 200 (e.g. Legacy WLAN) is defined as a target beacon transmission time (TBTT). When a TBTT for the NAN device 10 overlaps (or is close to) a DW for the NAN device 10, the NAN device 10 will not be able to switch to the second channel (e.g. channel 11) from the first channel (e.g. channel 6) to listen for beacons from the AP 201 of the second networking 200 (e.g. Legacy WLAN).

Figure 3:
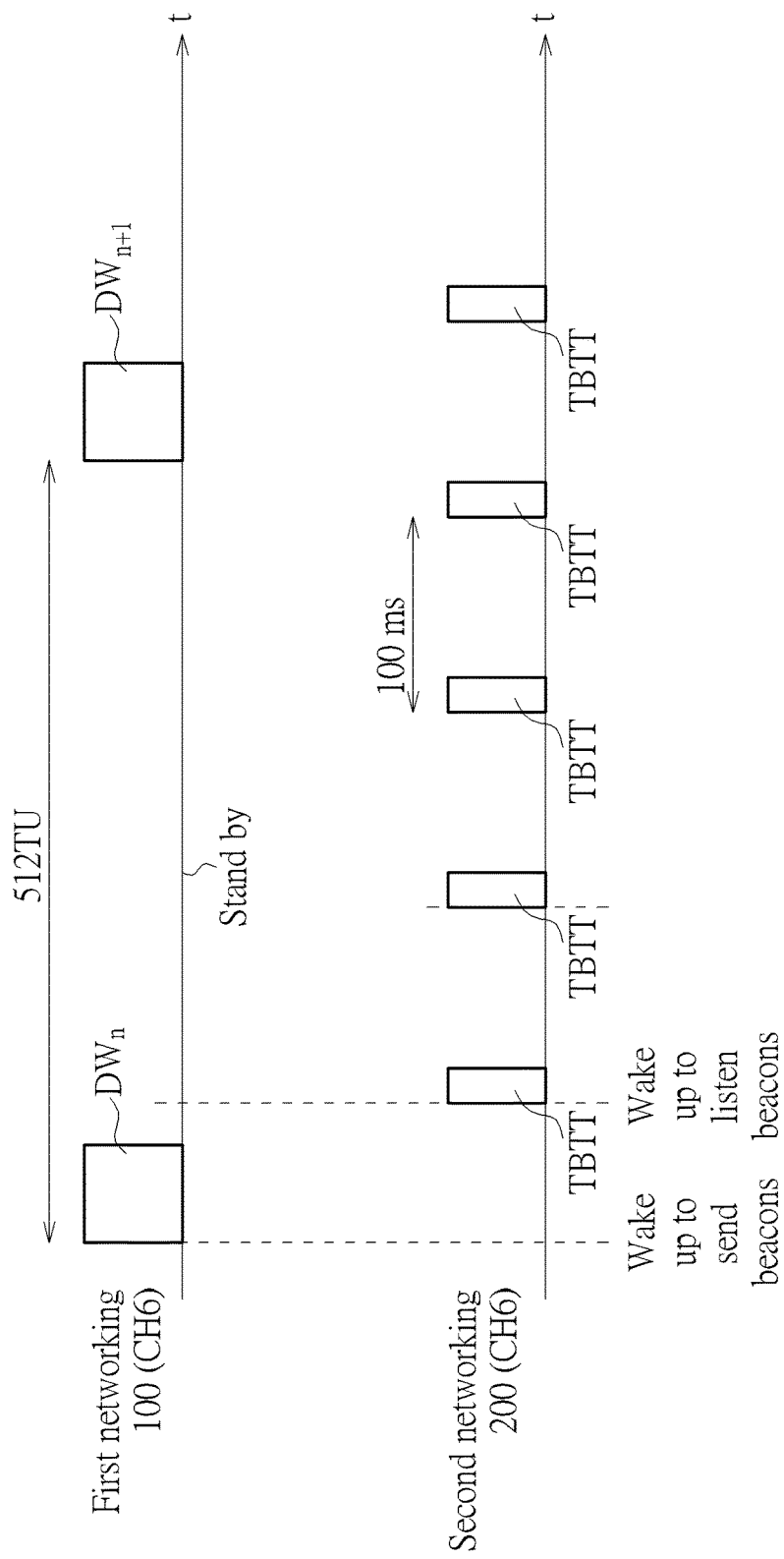
FIG. 3 is a diagram illustrating a second dual network scheduling issue under a concurrent operation between the first network and the second network.

FIG. 3 is a diagram illustrating a second dual network scheduling issue for the NAN device 10 under the concurrent operation of the first network and the second network. Assume the NAN device 10 has initially established the first network 100 (e.g. Wi-Fi Aware), and then tries to connect to the AP 201 of the second network (e.g. Legacy WLAN) in the same channel. The first network 100 may be established on the first channel (e.g. channel 6), and the second network 200 may also be established on the first channel. Concerning the first network 100 (e.g. Wi-Fi Aware), the NAN device 10 has to wake up to perform communication (e.g. sending beacons) with other NAN devices (e.g. the NAN devices 101-103) every predetermined time period (e.g. 512 time units as shown in FIG. 3). Concerning the second network 200 (e.g. Legacy WLAN), the NAN device 10 has to wake up to listen for beacons from the AP 201 of the second networking 200 (e.g. Legacy WLAN) every predetermined time period (e.g. 100 ms as shown in FIG. 3). When a TBTT for the NAN device 10 separates from a DW for the NAN device 10, the NAN device 10 needs to wake up, stand by and wake up again in a short time period which causes extra power consumption.

Based on the scenarios described in FIG. 2 and FIG. 3, the present invention provides a communicating method for the NAN device 10 to solve the associated problems.

Figure 4:
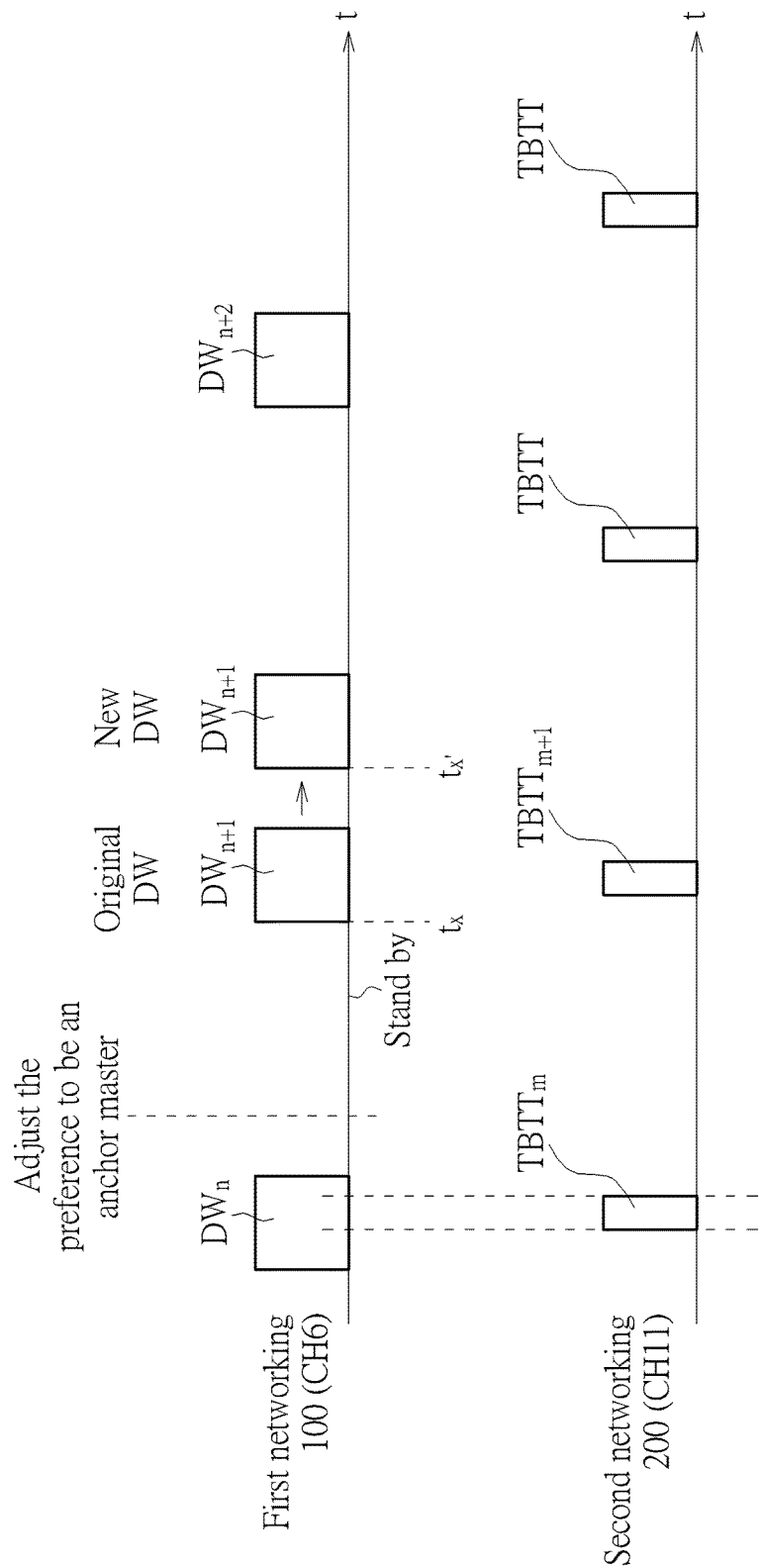
FIG. 4 is a diagram illustrating a communicating method under the concurrent operation between the first network and the second network described in FIG. 2.

FIG. 4 is a diagram illustrating a communicating method for the NAN device 10 under the concurrent operation of the first network 100 and the second network 200 with respect to the scenario described in FIG. 2, wherein the first network 100 (e.g. Wi-Fi Aware) and the second network 200 (e.g. Legacy WLAN) are established on different channels (e.g. CH6 and CH11, respectively). As shown in FIG. 4, when a $DW_n$ of the first network 100 (e.g. Wi-Fi Aware) for the NAN device 10 overlaps (or is close to) a $TBTT_m$ of the second network 200 (e.g. Legacy WLAN) for the NAN device 10, the NAN device 10 adjusts a preference parameter for the first network 100 (e.g. Wi-Fi Aware) in the stand-by period. After adjusting the preference parameter, the NAN device 10 becomes a master device (an anchor master) against the other NAN devices (e.g. the NAN devices 101-103) and can therefore wake up all NAN devices connecting to the first network 100 for sending beacons in every single DW. As shown in FIG. 4, after becoming the master device, the NAN device 10 adjusts a start point of a $DW_{n+1}$ from a time point $t_x$ to a time point $t'_x$ to separate the $DW_{n+1}$ from the $TBTT_{m+1}$. It should be noted that, after being the master device, the NAN device is not limited to adjust the start point of the $DW_{n+1}$ to separate the $DW_{n+1}$ from the $TBTT_{m+1}$. In other embodiments, the NAN device 10 can shorten the length of the $DW_{n+1}$ or adjust an end point of the $DW_{n+1}$ to achieve the same goal. Namely, the present invention does not limit the method for separating the $DW_{n+1}$ from the $TBTT_{m+1}$ as long as the desired goal can be achieved. Likewise, after becoming the master device, the NAN device 10 can adjust the length of the stand-by period between every two wake up periods so the DWs can always be separated from the TBTTs when the first network 100 and the second network 200 are established on different channels.

Figure 5:
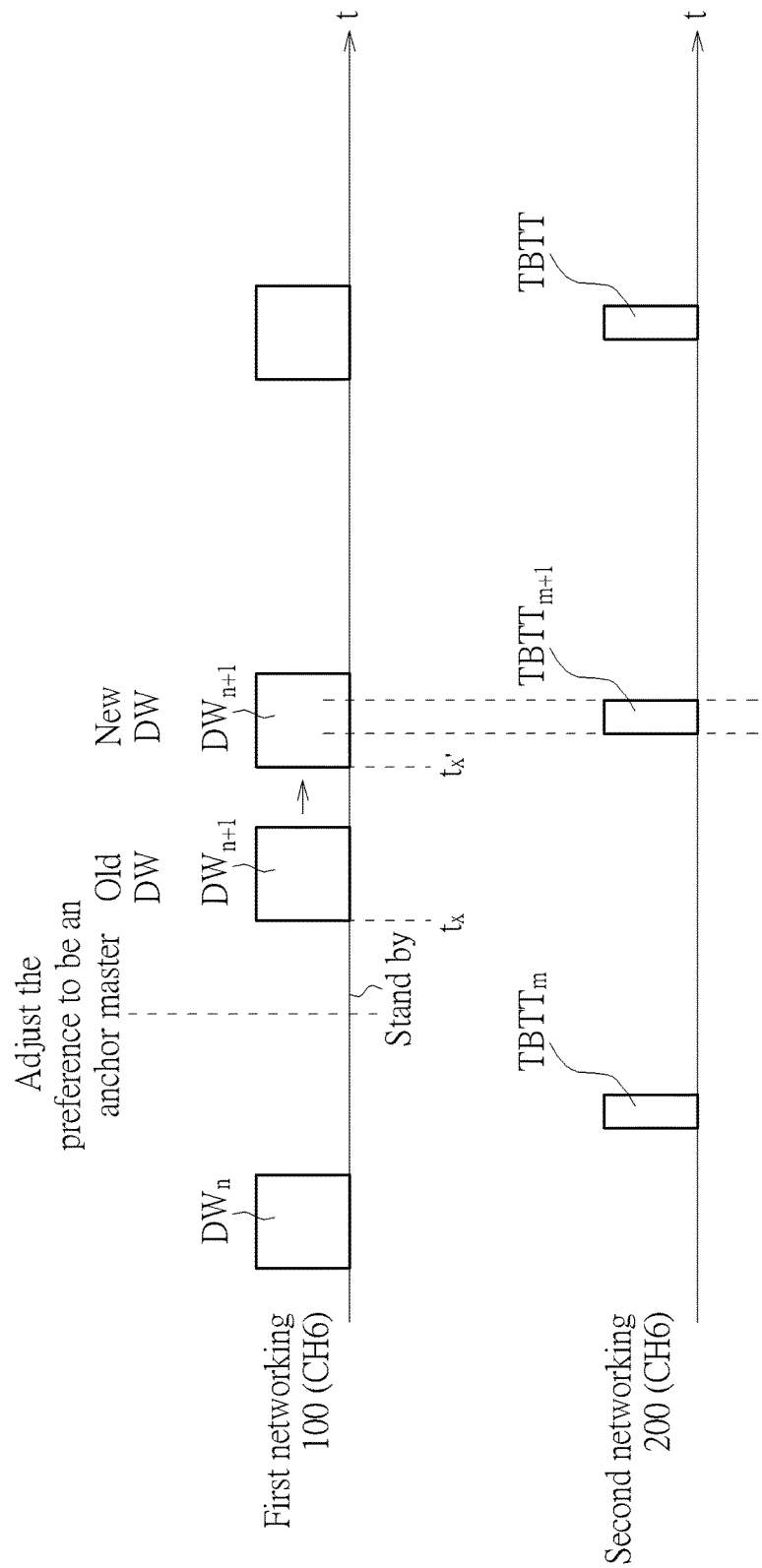
FIG. 5 is a diagram illustrating a communicating method under the concurrent operation between the first network and the second network described in FIG. 3.

FIG. 5 is a diagram illustrating a communicating method for the NAN device 10 under the concurrent operation of the first network 100 and the second network 200 with respect to the scenario described in FIG. 3, wherein the first network 100 (e.g. Wi-Fi Aware) and the second network 200 (e.g. Legacy WLAN) are established on the same channel (e.g. CH6). As shown in FIG. 5, when a $DW_n$ of the first network 100 (e.g. Wi-Fi Aware) for the NAN device 10 is separated from (or is close to) a $TBTT_m$ of the second network 200 (e.g. Legacy WLAN) for the NAN device 10, the NAN device 10 adjusts the preference parameter for the first network 100 (e.g. Wi-Fi Aware) in the stand-by period. After adjusting the preference parameter, the NAN device 10 becomes the master device (the anchor master) against the other NAN devices (e.g. the NAN devices 101-103) and can therefore decide the wake up period for all the NAN devices connecting to the first network 100 for sending the beacons. As shown in FIG. 5, after becoming the master device, the NAN device 10 adjusts a start point of a $DW_{n+1}$ from a time point $t_x$ to a time point $t'_x$ to make the $DW_{n+1}$ overlap the $TBTT_{m+1}$. It should be noted that, after being the master device, the NAN device is not limited to adjust the start point of the $DW_{n+1}$ to make the $DW_{n+1}$ overlap the $TBTT_{m+1}$. In other embodiments, the NAN device 10 can enlarge the length of the $DW_{n+1}$ or adjust an end point of the $DW_{n+1}$ to achieve the same goal. Namely, the present invention does not limit the method for making the $DW_{n+1}$ overlap the $TBTT_{m+1}$ as long as the desired goal can be achieved. Likewise, after becoming the master device, the NAN device 10 can adjust the length of the stand-by period between every two wake up periods so the DWs can always overlap the TBTTs when the first network 100 and the second network 200 are established on the same channel.

Figure 6:
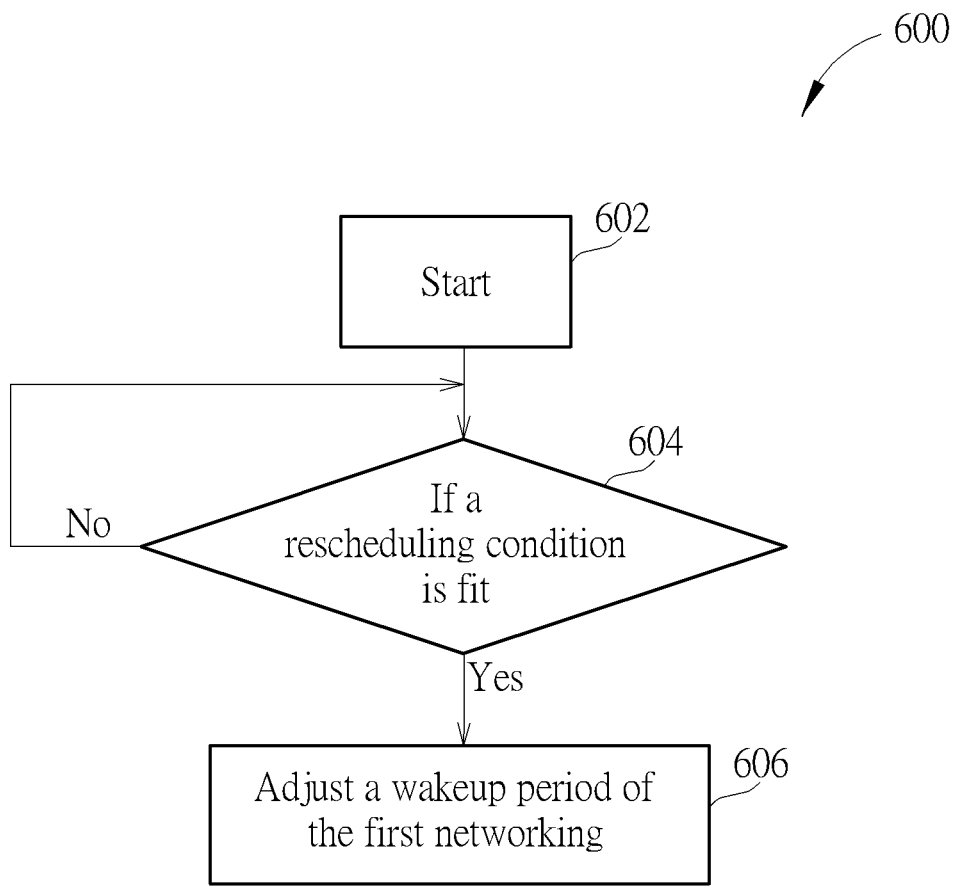
FIG. 6 is a flowchart illustrating a communicating method for connecting a first network and a second network according to an embodiment of the present invention.

FIG. 6 is a flowchart illustrating a communicating method 600 of the NAN device 10 for connecting the first network 100 and the second network 200 according to an embodiment of the present invention. Provided that the result is substantially the same, the steps are not required to be executed in the exact order shown in FIG. 6. The communicating method is summarized as follows.

Step 602: start.

Step 604: determine if a rescheduling condition is reached; if yes, the flow goes to step 606; otherwise, the flow goes to step 604.

The rescheduling condition mentioned above can be regarded as the scenarios described in FIG. 2 and FIG. 3. For example, the first network 100 and the second network 200 are established on different channels, and a wakeup period of the first network 100 overlaps (or is close to) a wakeup period of the second network 200. In another example, the first network 100 and the second network 200 are established on the same channel, and a wakeup period of the first network 100 is separated from (or is close to) a wakeup period of the second network 200.

Step 605: rescheduling the wakeup period of the first network 100.

As mentioned in the embodiments of FIG. 4 and FIG. 5, the wakeup period of the first network 100 can be rescheduled by adjusting a start point (or end point) of the wakeup period of the first network 100, or by adjusting the length (enlarging or shortening) of the wakeup period after being the master device against other devices connecting to the first network 100. Those skilled in the art should readily understand the operation of the communicating method of the NAN device 10 after reading the above embodiments. The detailed description is omitted here for brevity.

Figure 7:
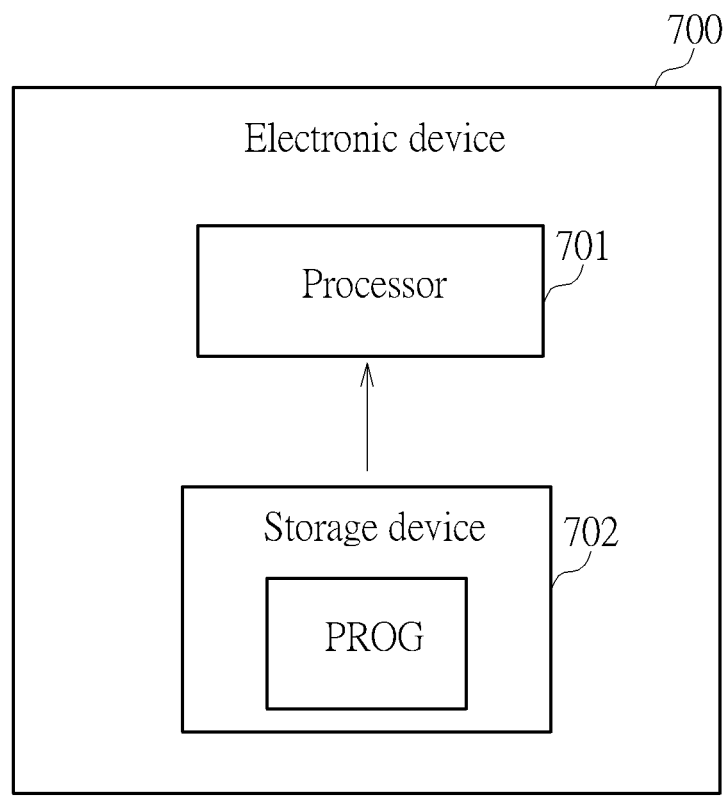
FIG. 7 is a diagram illustrating an electronic device according to an embodiment of the present invention.

FIG. 7 is a diagram illustrating an electronic device 700 for performing the aforementioned communicating method according to an embodiment of the present invention. The electronic device 700 comprises a processor 701, and a storage device 702 storing a program code PROG. When the program code PROG is loaded and executed by the processor 701, the communicating method 600 shown in FIG. 6 is executed. One skilled in the art should readily understand the operation of the processor 710 after reading the above paragraphs. The detailed description is therefore omitted here for brevity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communicating method of a communication device for connecting to a first network and a second network, comprising:
   when a rescheduling condition is reached, rescheduling a wake up period of the communication device for the first network at least according to a wake up period of the communication device for the second network;
   wherein the wake up period of the communication device for the first network is rescheduled by making the communication device a master device in the first network through adjusting a preference parameter of the first network.

2. The communicating method of claim 1, wherein the first network corresponds to a first channel and the second network corresponds to a second channel, and the rescheduling condition comprises:
   the wake up period of the communication device for the first network overlaps the wakeup period of the communication device for the second network when the first channel is different from the second channel.

3. The communicating method of claim 2, wherein the wake up period of the communication device for the first network does not overlap the wakeup period of the communication device for the second network after rescheduling the wake up period of the communication device for the first network.

4. The communicating method of claim 1, wherein the first network corresponds to a first channel and the second network corresponds to a second channel, and the rescheduling condition comprises:
   the wake up period of the communication device for the first network does not overlap the wakeup period of the communication device for the second network when the first channel is identical to the second channel.

5. The communicating method of claim 4, wherein the wake up period of the communication device for the first network overlaps the wakeup period of the communication device for the second network after rescheduling the wake up period of the communication device for the first network.

6. The communicating method of claim 1, wherein the communication device determines a start point of the wake up period for communication devices connecting in the first network after the communication device is made the master device.

7. The communicating method of claim 1, wherein rescheduling the wake up period of the communication device for the first network at least according to the wake up period of the communication for the second network when the rescheduling condition is reached comprises:
   connecting to the first network; and
   when connected to the first network:
      detecting the wake up period of the communication device for the first network and the wake up period of the communication for the second network; and
      rescheduling the wake up period of the communication device for the first network when the rescheduling condition is reached.

8. The communicating method of claim 1, further comprising:
   sending beacons to other communication devices connecting in the first network during the wake up period of the communication device for the first network.

9. The communicating method of claim 1, further comprising:
   listening for beacons from an access point of the second network during the wake up period of the communication device for the second network.

10. The communicating method of claim 1, wherein the first network is Wi-Fi aware.

11. An electronic device for connecting a first network and a second network, comprising:
    a storage device, arranged to store a program code; and
    a processor, arranged to execute the program code;
    wherein when loaded and executed by the processor, the program code instructs the processor to execute following steps:
    when a rescheduling condition is reached, rescheduling a wake up period of the communication device for the first network at least according to a wake up period of the communication device for the second network;
    wherein the wake up period of the communication device for the first network is rescheduled by making the communication device a master device in the first network through adjusting a preference parameter of the first network.

12. The electronic device of claim 11, wherein the first network corresponds to a first channel and the second network corresponds to a second channel, and the rescheduling condition comprises:
    the wake up period of the electronic device for the first network overlaps the wakeup period of the electronic device for the second network when the first channel is different from the second channel.

13. The electronic device of claim 12, wherein the wake up period of the electronic device for the first network does not overlap the wakeup period of the electronic device for the second network after rescheduling the wake up period of the communication device for the first network.

14. The electronic device of claim 11, wherein the first network corresponds to a first channel and the second network corresponds to a second channel, and the rescheduling condition comprises:

the wake up period of the electronic device for the first network does not overlap the wakeup period of the electronic device for the second network when the first channel is identical to the second channel.

15. The electronic device of claim 14, wherein the wake up period of the electronic device for the first network overlaps the wakeup period of the electronic device for the second network after rescheduling the wake up period of the communication device for the first network.

16. The electronic device of claim 11, wherein the electronic device determines a start point of the wake up period for electronic devices connecting in the first network after the communication device is made the master device.

17. The electronic device of claim 11, wherein rescheduling the wake up period of the electronic device for the first network at least according to the wake up period of the communication for the second network when the rescheduling condition is reached comprises:

connecting to the first network;

detecting the wake up period of the electronic device for the first network and the wake up period of the communication for the second network; and rescheduling the wake up period of the electronic device for the first network when the rescheduling condition is reached.

18. The electronic device of claim 11, wherein the program code instructs the processor to further execute the following step:

sending beacons to other electronic devices connecting in the first network during the wake up period of the electronic device for the first network.

19. The electronic device of claim 11, wherein the program code instructs the processor to further execute the following step:

listening for beacons from an access point of the second network during the wake up period of the electronic device for the second network.

20. The electronic device of claim 11, wherein the first network is Wi-Fi aware.

* * * * *